VIDEO TAPE RECORDER EMPLOYING A DELAY OF THE HORIZONTAL SYNC SIGNALS TO FACILITATE SEPARATION FROM THE VIDEO SIGNAL
Filed Aug. 24, 1966
7 Sheets-Sheet 1
FIG. 1
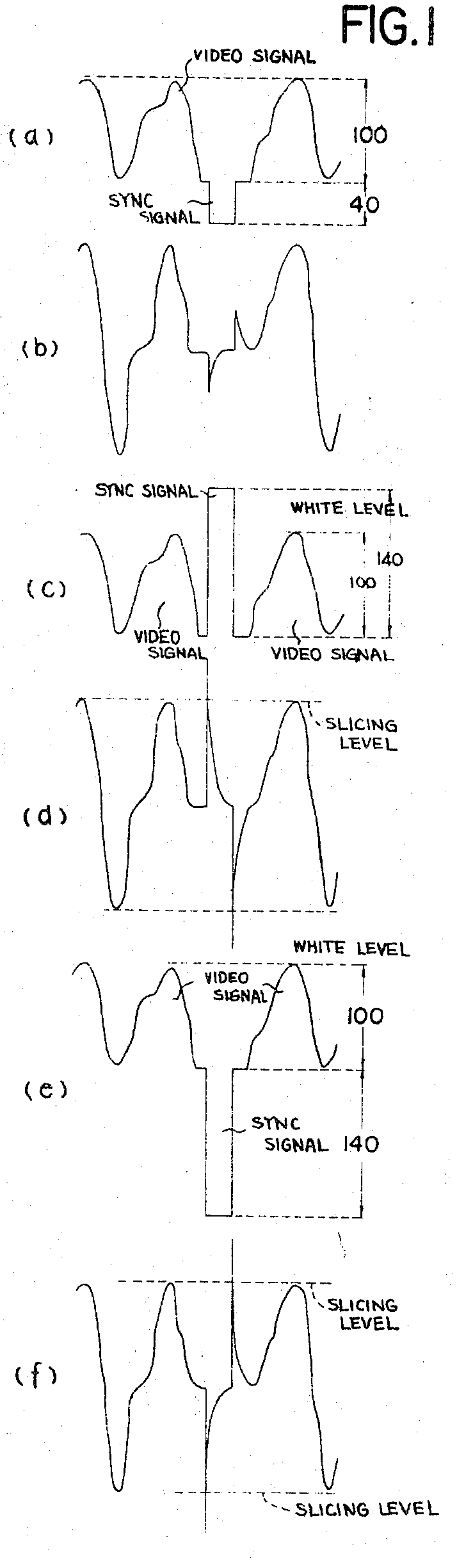
FIG. 2
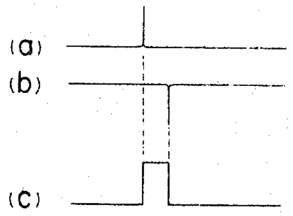
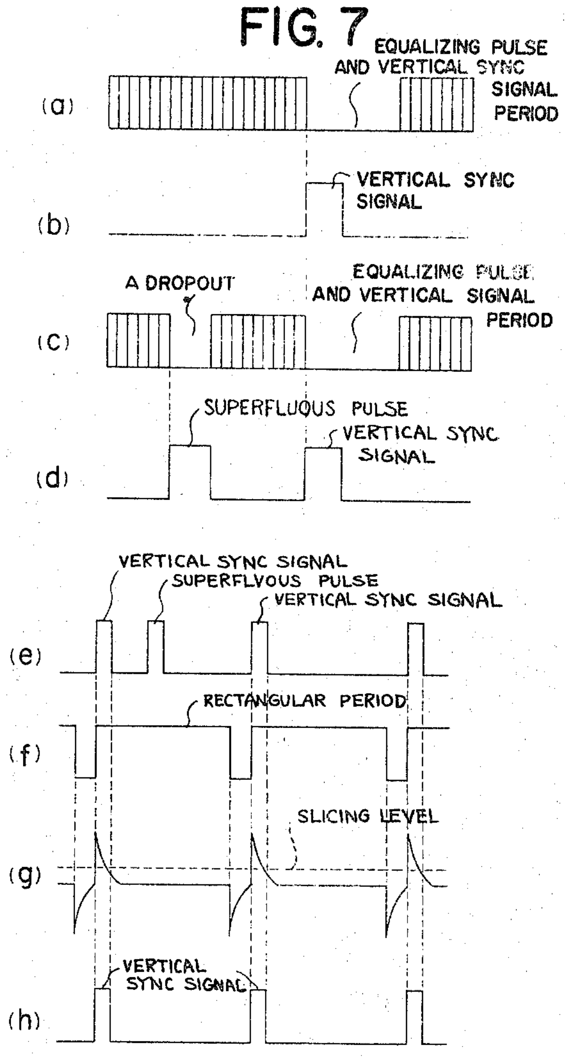

Jan. 6, 1970 KATSUYUKI IWAI ET AL 3,488,433

VIDEO TAPE RECORDER EMPLOYING A DELAY OF THE HORIZONTAL SYNC SIGNALS TO FACILITATE SEPARATION FROM THE VIDEO SIGNAL

Filed Aug. 24, 1966 7 Sheets-Sheet 3

Jan. 6, 1970 KATSUYUKI IWAI ET AL 3,488,433

VIDEO TAPE RECORDER EMPLOYING A DELAY OF THE HORIZONTAL SYNC SIGNALS TO FACILITATE SEPARATION FROM THE VIDEO SIGNAL

Filed Aug. 24, 1966 7 Sheets-Sheet 5

United States Patent Office 3,488,433

Patented Jan. 6, 1970

3,488,433

VIDEO TAPE RECORDER EMPLOYING A DELAY OF THE HORIZONTAL SYNC SIGNALS TO FACILITATE SEPARATION FROM THE VIDEO SIGNAL

Katsuyuki Iwai, Motonori Fukatsu, and Fujio Sato, Tokyo, Japan, assignors to Akai Electric Company Limited, Tokyo, Japan, a Japanese corporation Filed Aug. 24, 1966, Ser. No. 574,585
Claims priority, application Japan, Dec. 3, 1965, 40/74,193
Int. Cl. H04n 5/78, 5/08
U.S. Cl. 178—6.6 3 Claims

ABSTRACT OF THE DISCLOSURE

A means for accurately recording and reproducing a video signal from a magnetic tape with a video tape recorder by eliminating wave distortion caused by the equalization step in the reproduction stage. The sensing of the horizontal sync signals is facilitated by increasing their magnitude above the level of the video signals and by causing a relative delay between the horizontal sync signals and the video signals. In the recording stage the horizontal sync signals are eliminated from the video signals during the vertical sync signal time. In the reproducing stage the horizontal sync signals are separated from the video signal before the equalization step and are employed to regenerate the vertical sync signals.

BACKGROUND OF THE INVENTION

Field of the invention

This invention relates to improvements in magnetic recording and reproducing in video tape recorders employing the direct magnetic recording technique.

Description of the prior art

It is commonly known to those skilled in the art of video tape recorders employing the direct recording and reproducing technique, that it is difficult to reproduce the lower frequency signal components from the directly recorded signal information. This occurs particularly when the reproduced lower frequency signal is subjected to an equalization step because the equalizing pulse periods and the vertical blanking periods will generally be subjected to a considerable wave distortion.

If a reproduced television signal subjected to this kind of wave distortion in the range of vertical blanking periods is further processed in a video tape recorder, the regular separation of horizontal synchronizing pulses, hereinafter referred to as "sync pulses," will become highly unstable; thus considerable difficulties are realized in the vertical synchronization of reproduced scanning lines which give rise to distorted visual images on the screen of a monitoring set.

According to a proposal already made for the removal of the separate and additional magnetic reproducing head to pick up lower frequency signal components from the recorded signal. Our practical experiments indicate that even the provision of such a separate and additional magnetic head adapted for reproducing lower frequency signal components does not meet the stringent demands for efficient reproduction of the lowest frequency signal components. Therefore, there has been no effective measure, for substantially eliminating the aforementioned wave distorsion encountered in the reproducing stage of the video tape recorder of the type referred to above.

SUMMARY OF THE INVENTION

The invention may be summarized as a means to eliminate the difficulties in vertical synchronization caused by the wave distortion produced by the equalization step of the reproducing stage in a video tape recorder. In the recording stage the horizontal sync signals are delayed relative to the composite video signal so as to facilitate their reproduction and are eliminated from the video signal during the vertical sync pulse interval. In the reproduction stage the horizontal sync signals are separated from the video signal before the equalization step and are employed to regenerate the vertical sync signals.

It is therefore the primary object of the present invention to provide a magnetic direct recording and reproducing system adapted for use with video tape recorders which is capable of providing reliable separation of sync pulses, thereby reproducing stable and precisely reproduced sync pulses.

Another object of the invention is to provide a magnetic recording and reproducing system capable of obviating adverse effects on the video signal components by the rising and/or descending edge of the compound sync signal of the reproduced composite video signal in advance of an equalizing process, thus providing sharp and well-defined sync pulses having a considerably greater magnitude than that of the video signal.

Still another object of the present invention is to provide a magnetic recording and reproducing system of the kind referred to above and capable of providing vertical sync pulses having a highly favorable signal-to-noise ratio and a highly improved stability.

A still further object of the present invention is to provide a magnetic recording and reproducing system wherein a clear, sharp and stable separation of sync pulses may be realized by obviating the otherwise unstable nature of the sync pulse separation which is caused by the amplitude difference between the rising and descending edges of equalizing pulses contained in the reproduced composite video signal in advance of processing in the equalizing step, on the one hand, and the rising and descending edges of vertical sync pulses, on the other hand.

Still another object of the present invention is to provide a magnetic recording and reproducing system, capable of providing a stabilized vertical synchronization by obviating the instability which is caused by voids in the reproduced signal as invited by frequently encountered dropouts and the like.

Still another object of the invention is to provide a magnetic recording and reproducing system capable of effectively restoring the D.C. components contained in the composite video signal.

These and further objects, features and advantages of the invention will become clear in the following detailed description of the invention with reference to the accompanying drawings; wherein a preferred embodiment adapted for effectively carrying out the present novel system is shown only by way of example and not as limiting the invention.

BRIEF DESCRIPTION OF THE DRAWINGS

FIG. 1(*a*)–(*f*) shows a plurality of model wave forms of conventional and modified television signals in the recording stage and in the reproducing stage before the D.C. restoration process.

FIG. 2 is a wave chart used to illustrate the separation of compound sync pulse comprising a sync pulse and equalizing pulses from a reproduced composite video signal before the equalizing processing.

FIG. 7 shows a series of explanatory wave forms illustrating a method for eliminating the instable vertical synchronization caused by signal dropouts or the like.

DESCRIPTION OF THE PREFERRED EMBODIMENT

Figure 3:
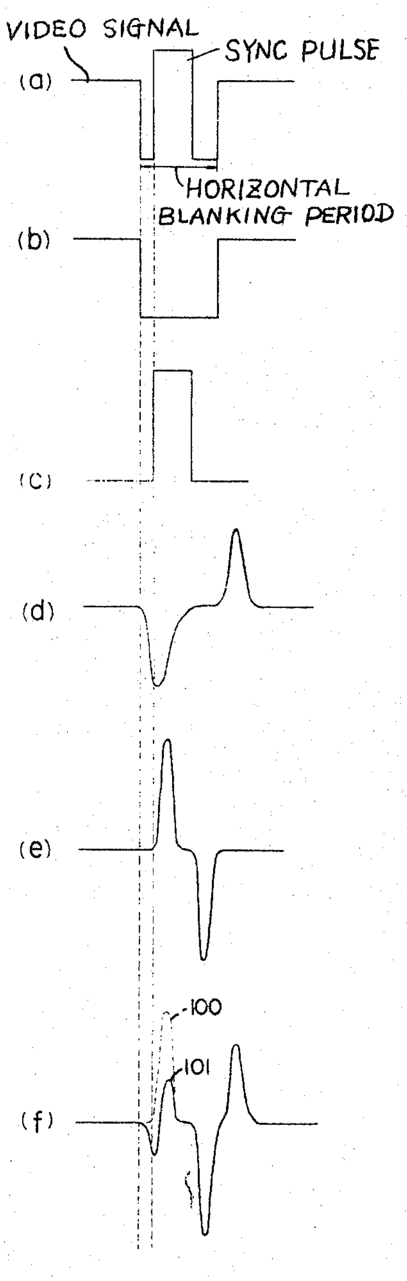
FIG. 3 shows a series of explanatory wave forms illustrating the reproduction of a modified television signal which has its sync pulses considerably accentuated.

Now referring to the accompanying drawings, FIG. 1(*a*) illustrates a regular television signal. In this case, when the white level of video signal component is represented by 100 units, the level of sync signal can be expressed by −40 units. When this television signal is magnetically recorded and reproduced in the direct manner, the reproduced signal may take a form as schematically represented in FIG. 1 (*b*), if the signal has not been subjected to an equalizing processing. From this wave form, differentiated so to speak, it is practically impossible to separate the sync signal by amplitude separation or other conventional techniques, from the video signal components.

In the present novel system, the level of the sync signal is modified to a considerably higher one, such as about 140 units, than the white level of the video signal if the latter be taken as 100 units. In this case, the polarity of the modified sync signal is selected to be the same as that of the video signal, as represented in FIG. 1(*c*). The corresponding differentiated signal is shown in FIG. 1(*d*). From this it can be easily acknowledged that the desired separation of sync signal can be carried into effect without any difficulty.

It is also possible within the framework of the present invention to select the modified sync signal so as to have the reversed polarity relative to that of the video signal, as shown in FIG. 1(*e*). The corresponding differentiated signal form is shown in FIG. 1(*f*), from which it can be also acknowledged, the sync signal may again be separated without difficulty. However, in order to utilize effectively the rather limited dynamic range of the recording system embodied in the video tape recorder, and thereby increasing the video signal level and improving the signal-to-noise ratio, it is highly recommendable to use the modified sync signal having the same polarity as that of the video signal.

In FIG. 2(*a*) and (*b*), sharply defined pulses which are derived from the rising edge and descending edge of a rectangular pulse, respectively, as shown in FIG. 1 at (*d*) are reproduced in a more simplified and separated form. For this separation, in practice, the conventional amplitude separation technique may be employed. These pulses are utilized to trigger a conventional bistable multivibrator for regenerating a sync pulse and so on, as will be more fully described hereinafter.

When reviewing a horizontal blanking period of a television signal, as seen from several wave curves in FIG. 1, the length of the front porch in advance of the sync pulse is shorter than that of the back porch in the rear of the sync pulse. This fact, in addition with the narrow frequency band with which the domestic video tape recorder and the like are designed to operate, leads to a considerable distortion in the duration period of the rising edge of the reproduced sync pulse as appearing in advance of the regular equalizing processing, even when the peak of the original sync pulse has been considerably increased in its level to +140 units or percent, as was referred to hereinabove. On account of this defective phenomenon, the difference in signal level between the white level of the video signal component and the peak of the sync pulses of the reproduced television signal to be further processed for separating sync pulses from the video signal component will become disadvantageously smaller than expected.

For better understanding this phenomenon, the blanking signal and the sync signal may be separately considered.

In FIG. 3(*a*) a blanking period of a television signal is shown wherein however the peak level of the contained sync pulse has been modified to +140% as was referred to above. In (*b*) and (*c*) in the same figure, the horizontal blanking signal and the sync pulse normally and otherwise contained therein are separately shown. In (*d*) and (*e*), the correspondingly reproduced signals derived from the above separated two kinds of signals are shown, respectively, as processed in the direct recording and reproducing system of a conventional domestic video tape recorder capable of treating only narrow frequency band of signals. In FIG. 3(*f*), a combined signal of these two signals at (*d*) and (*e*) is shown. The dotted pulse peak 100, which must be reproduced, has been considerably reduced to that shown by a full-lined peak 101. From comparison of signal curves in (*d*), (*e*) and (*f*) it can be seen that in this figure, this phenomenon is caused by the shorter duration period of the front porch, since the pulse derived from the leading edge of the sync pulse is considerably cancelled out by the pulse which has been derived from the rear edge of the related horizontal blanking period.

With such distorted and shortened pulses corresponding to the leading edges of sync pulses contained in a reproduced television signal, it is naturally highly difficult to separate sync pulses from the related video signal components contained in the television signal in further processing stages of the reproducing system including the equalization step.

It is therefore recommended according to this invention to shift in the recording stage each of the sync pulses at its leading edge of the middle point, or a close proximity thereof, of the respective blanking period, in order to more conveniently separate the sync pulses from the television signal at a later signal processing stage.

Figure 4:
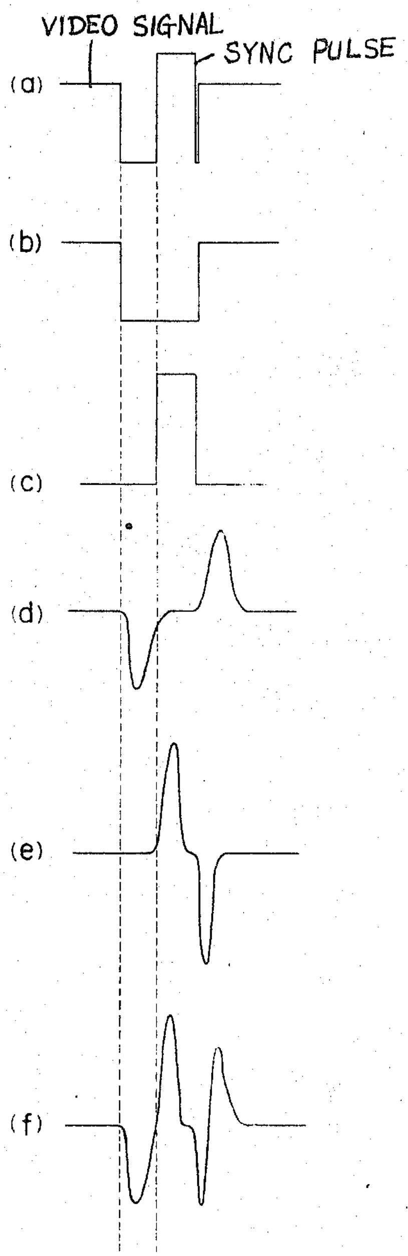
FIG. 4 shows similar wave forms illustrating reproduction of a modified television signal having its sync pulses considerably accentuated and phase-shifted from those of standardized regular sync pulses.

Several wave forms shown in FIG. 4(*a*)-(*f*) illustrate the modified signal and the advantageous results therefrom in comparison with several corresponding curves shown in FIG. 3(*a*)-(*f*), respectively. As clearly seen from FIG. 4(*f*), the pulse derived from the leading edge of the sync pulse has been sharply defined according to the above proposed technique for shifting the position of the sync pulse relative to the blanking signal.

In the case of modified embodiment wherein a pulse derived from the trailing edge of the sync pulse is separated for regeneration of sync pulse or the like, the trailing edge, in place of the leading edge, can be shifted to the middle point of the related blanking period, for obtaining similar results.

Figure 5:
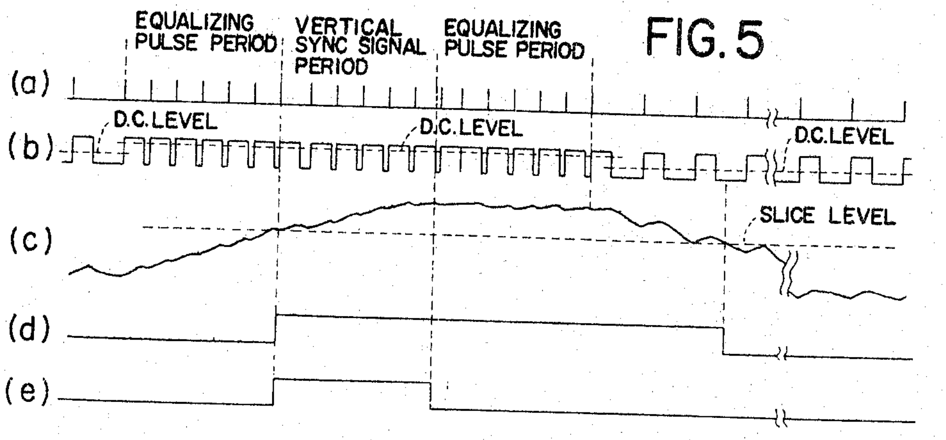
FIG. 5 shows a series of explanatory wave forms illustrating the separation of sync pulses from a modified television signal.

In FIG. 5, several explanatory wave forms illustrate the way to regenerate stable and definite vertical sync pulses relying upon the separated sharp pulses derived from the leading or trailing edges of the sync pulses contained in a television as magnetically reproduced in the aforementioned way.

In FIG. 5 at (*a*), a series of pulses separated in the aforementioned way in correspondence to the leading edges of the reproduced sync pulses in this case. These pulses are fed to a monostable multivibrator for triggering the latter, the duration time period of each of the delivered rectangular pulses therefrom depending naturally upon the design time constant of the multivibrator and being set to a value somewhat shorter than one half of the horizontal scanning period employed in the television signal under treatment. The resultant series of rectangular wave pulses is shown in FIG. 5(*b*).

Since twice the number of pulses are generated in comparison with the horizontal scanning frequency the vertical sync pulse period as well as equalizing pulse period, as well be clearly seen from FIG. 5(*a*), the rectangular output pulses from the multivibrator will be delivered in the corresponding increased number, and therefore the D.C. level of the pulses in these periods is considerably higher than that prevailing in other periods, as clearly observed from FIG. 5(*b*).

When this series of rectangular pulses is subjected to an integration, a signal wave as shown in (*c*) of the same figure may be obtained. When this signal is subjected to an amplitude separation at a signal level corresponding to that of the vertical sync pulses and the thus separated signal in (*d*) of the same figure is shaped accordingly, a vertical sync signal as shown in (*e*) will be obtained.

In the foregoing, only a monostable multivibrator has been referred to as the rectangular wave generator, but it will be well understood that the invention should not be limited thereto. Various other means which are known to those skilled in the art, such as a rectangular wave signal generator capable of delivering such signal, upon reception of a trigger signal may equally be employed for the above mentioned purpose.

The vertical sync signal obtained in the aforementioned manner generally represents a better signal-to-noise ratio than that which is obtained by directly integrating the trigger pulses.

Figure 6:
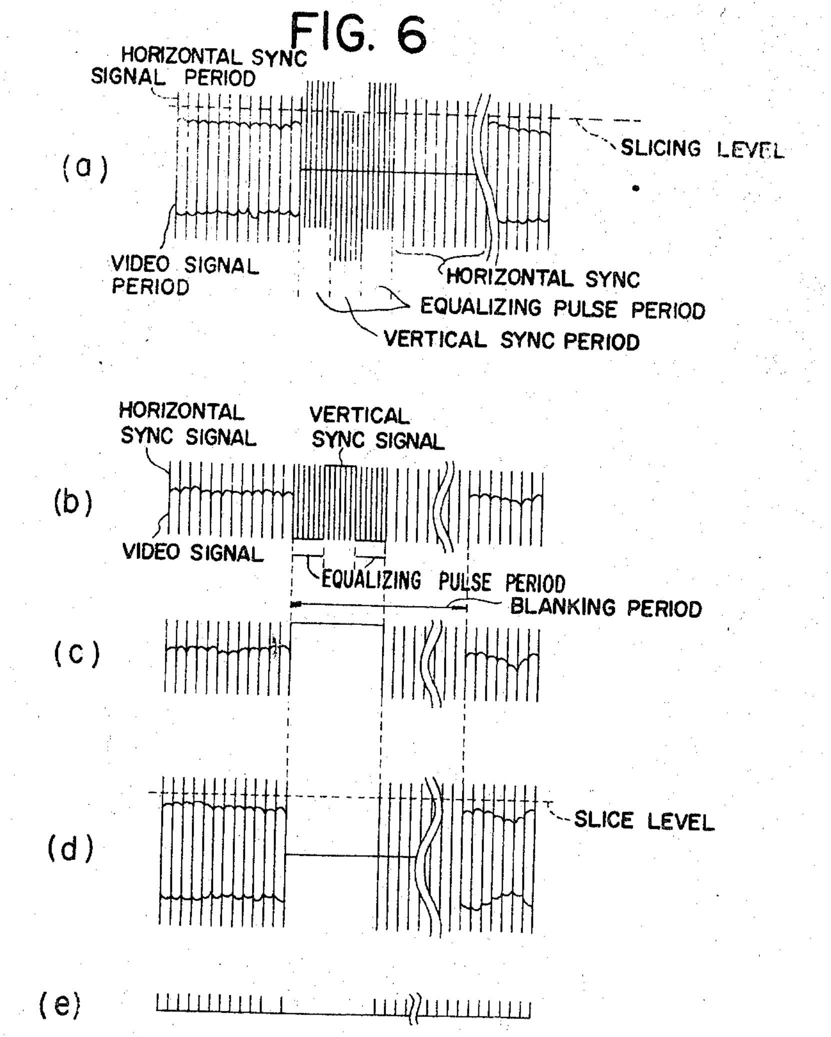
FIG. 6 shows a series of explanatory wave forms illustrating a method for eliminating instable vertical synchronization.

On account of the narrow frequency range of signals capable of being treated by the magnetic recording and reproducing system generally employed in the domestic video tape recorder, as already mentioned, and of the incomplete nature of differentiation as appearing in the reproduced television signal before being subjected to the regular equalizing processing, the television signal will represent slightly offset amplitude steps in ranges of equalizing pulse and vertical sync pulse periods, as shown in FIG. 6(*a*). If the peak level of the sync pulse be set nearer to the white level of the video signal in order to obviate the aforementioned drawback, the separation of the offset pulses would become highly difficult which results in disadvantageous instability of vertical synchronization.

In order to obviate aforementioned drawback and for attaining a positive and reliable stability of the desired vertical synchronization, it is now proposed according to the invention to magnetically record the modified television signal having its positively accentuated sync pulses as shown in FIG. 6(*b*) in a simplified manner, upon removing further the conventional sync pulses and equalizing pulses from said modified television signal during a definitely selected substantial and initial period of each of the blanking periods which includes the first equalizing pulse period, the next succeeding synchronizing pulse period and the second equalizing pulse period succeeding therefrom. The thus further modified recording television signal is partially shown in FIG. 6(*c*). The recorded signal will have substantially same signal form. The reproduced signal therefrom is shown (*d*) of the same figure. In advance of the equalization of the reproduced signal, a series of differentiated pulses derived therefrom is separated as before, in the manner schematically illustrated in (*d*) of the same figure. These pulses are then utilized for triggering a monostable multivibrator and the output signal is subjected to an integration for regenerating rectangular pulses, as in the same manner described hereinbefore with reference to FIG. 5.

With use of conventional video tape recorders, difficulties are frequently encountered from dropouts in the television signal which are caused substantially from interior quality of the magnetic coating layer on the recording tape.

This kind of difficulty is aggrevated when a group of horizontal sync pulses is periodically and intentionally removed from the television signal to be recorded, in the aforementioned manner.

In order to obviate such difficulty, efficient counter measures are employed in the system according to this invention, as will become clear in the following description.

In FIG. 7(*a*), a series of differentiated pulses having periodically interrupted periods is partially and schematically represented in the same manner as in FIG. 6(*e*).

In FIG. 7(*b*), a regenerated rectangular signal in the manner as was already described with reference to FIG. 5(*e*) is shown.

If the recording television signal represents a considerable dropout, then the reproduced and thus differentiated signal containing a series of periodical pulses with periodical interruptions as illustrated in FIG. 7 at (*a*) will be converted to that as shown by way of example in (*c*) of the same figure. As shown, a large unintentional interruption corresponding to the original dropout will appear which means a considerable difficulty in the video tape recording technique. The regenerated pulse series will therefore contain a disadvantageous and superfluous pulse as specifically shown in the output signal from the multivibrator used for the rectangular pulse regeneration, as illustrated in (*d*) in the same figure. In order to screen-off this kind of superfluous pulse, the output signal in (*d*) delivered from the regular regenerating monostable multivibrator is fed, according to this invention, to a further monostable multivibrator, the time constant of which is selected to a value smaller than the regular vertical scanning period, for triggering the second multivibrator. The output signal of the latter is shown by way of example in (*f*) of the same figure, this signal being removed from the undesirous influence of the dropout.

The rectangular pulse series shown in (*f*) is then subjected to a differentiation and finally to a regeneration for shaping a series of vertical sync pulses, as shown in (*g*) and (*h*) of the same figure, respectively.

Monostable multivibrators used and described with reference to FIG. 7 may be replaced by astable multivibrators, blocking oscillators or any equivalent means.

Figure 8:
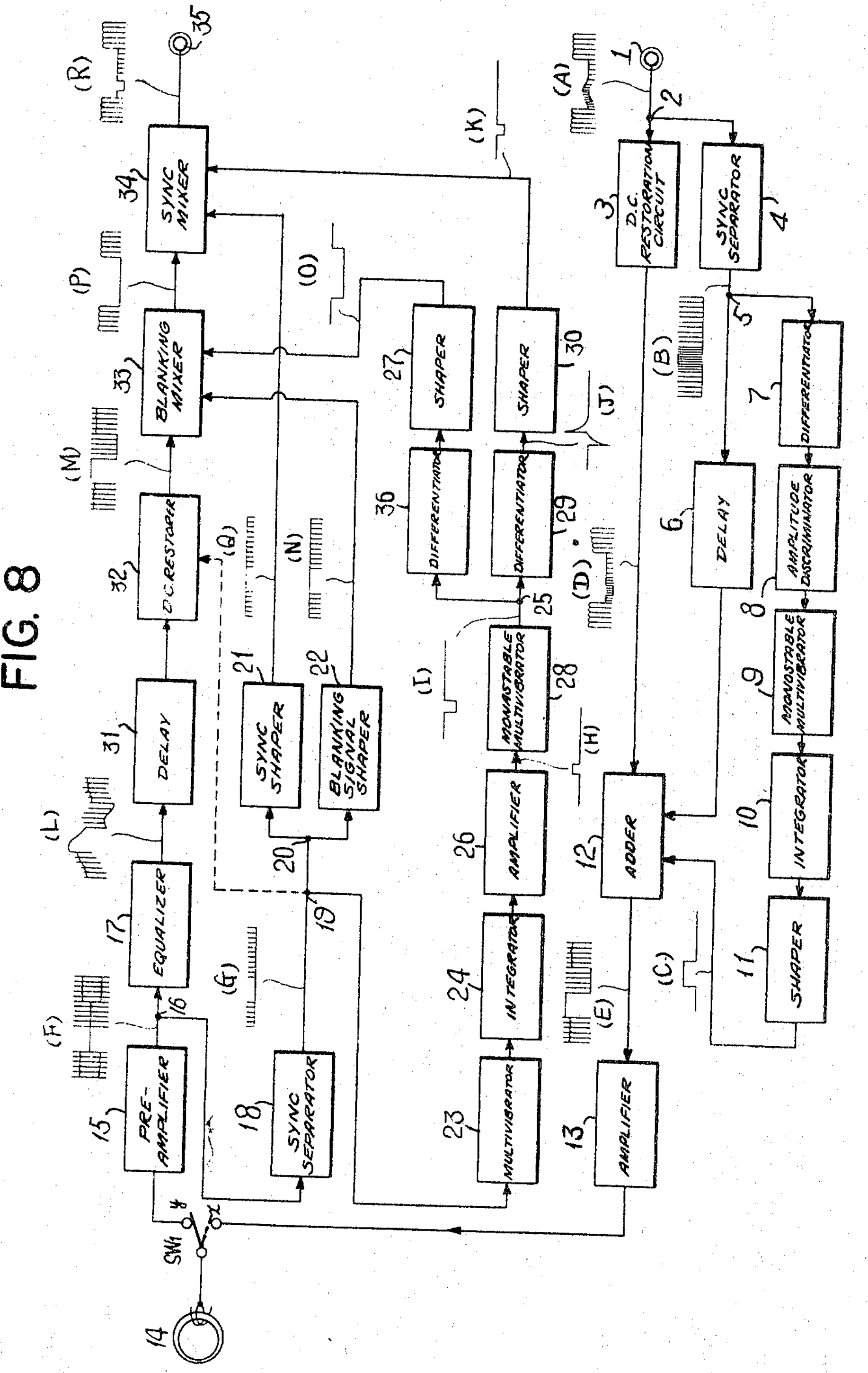
FIG. 8 is a block diagram of a magnetic recording and reproducing system employing the direct recording technique and embodying the present invention.
Figure 9:
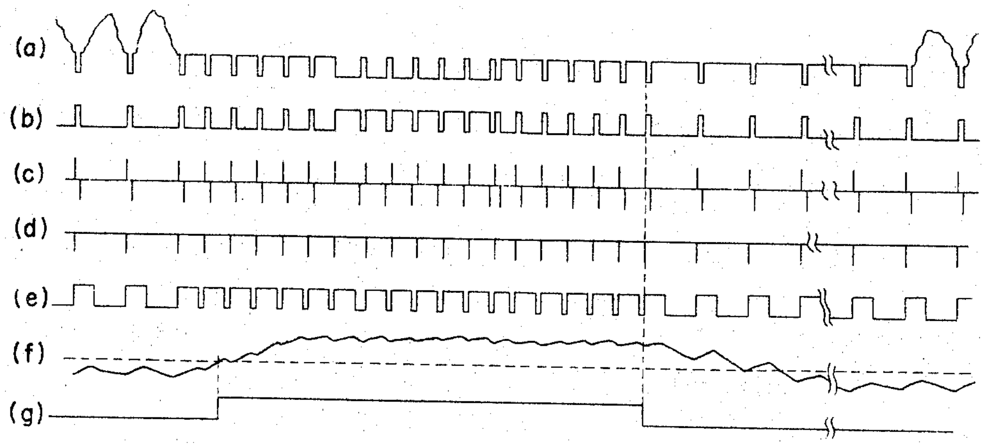
FIG. 9 shows a series of wave forms as appearing in several points in the system shown in FIG. 8.

In FIG. 8, wherein a preferred embodiment of the recording and reproducing system of a video tape recorder embodying the novel invention is shown, 1 represents an input terminal which is adapted to receive a television signal, an example of which is shown schematically as (A) and substantially for a vertical blanking period [see also FIG. 9(*a*)]. The input signal is conveyed through a junction 2 to both D.C. restoration circuit 3 and sync separator 4, wherein the video signal component is separated off, thereby the sync signal component (B) with its polarity reversed being formed [see also FIG. 9(*b*)]. The thus separated sync signal is fed through a junction 5 to a delay circuit 6*a* and differentiating circuit 7. In the former circuit 6, the sync signal is subjected to such a delay, as was referred to hereinbefore in reference to FIG. 4, that the front edge of the horizontal sync signal is shifted to the mid point of the blanking period. On the other hand, the differentiated signal in the circuit 7 represents a series of spike pulses as schematically represented in FIG. 9(*c*). This pulse series is then supplied to amplitude discriminator circuit 8, so as to eliminate those corresponding to rising edges of the sync pulses which are shown in FIG. 9(*d*). The output of the discriminator 8 is fed to monostable multivibrator 9 for triggering the latter, the time constant of the multivibrator being selected to be slightly shorter than the horizontal period, thereby delivering a series of rectangular wave pulses as shown in FIG. 9(*e*). These rectangular pulses are then fed to integrator circuit 10 which produces integrated waveform as shown in FIG. 9(*f*). This signal is then conveyed to shaping circuit 11, thereby producing a series of rectangular pulses (*c*) one of which is shown in FIG. 9(*g*); the period of each one of said pulses corresponds to the sum of an equalizing pulse period and a vertical sync signal period.

The D.C.-restored television signal (D) in the restoration circuit 3, the delayed sync signal from delay circuit 6 and the pulse signal (C) delivered from shaping circuit 11 are then fed to adder circuit 12 so as to be added therein, and thereby delivering a composite video signal (E) which has a sync signal having the same polarity as that of the original video signal but phase-shifted to the back porch side, said composite signal being however dispensed with equalizing pulses and vertical sync pulses.

This compound video signal is then processed in amplifier 13 to a proper signal level and through stationary contact *x* of switch $SW_1$ to a recording and reproducing magnetic head 14, when the switch is manipulated to its dotted line position. The signal is then magnetically recorded on a conventional magnetic tape, not shown, which is arranged to cooperate with the head.

When it is desired to initiate a reproducing operation for the reproduction of the thus recorded signal, the switch $SW_1$ is transferred manually to its full-lined position, so as to cooperate with another contact *y*. The signal thus picked-up by the head 14 from the recorded tape is conveyed to a preamplifier 15 wherein it is amplified to a proper signal level. This reproduced and amplified compound video signal is shown as (F), and as already explained, is a kind of differentiated signal with substantially no wave deformation, with a series of positive sync pulses of considerably greater magnitude than the white level of the video signal component. This signal is in addition deficient of equalizing pulses and vertical sync pulses at specified regular intervals as already mentioned. The compound video signal shown schematically at (F) [also refer to FIG. 6(*d*)] is branched off at junction 16 and thence fed to equalizer 17 and sync separator circuit 18. In separator circuit 18, the generated spike pulse at each leading edge of the sync pulses is separated and the separated pulse series (G) [see also FIG. 6(*e*); FIG. 7 at (*d*) and (*c*)] is further conveyed through junctions 19 and 20 to horizontal sync signal shaping circuit 21 and horizontal blanking signal shaping circuit 22.

Figure 10:
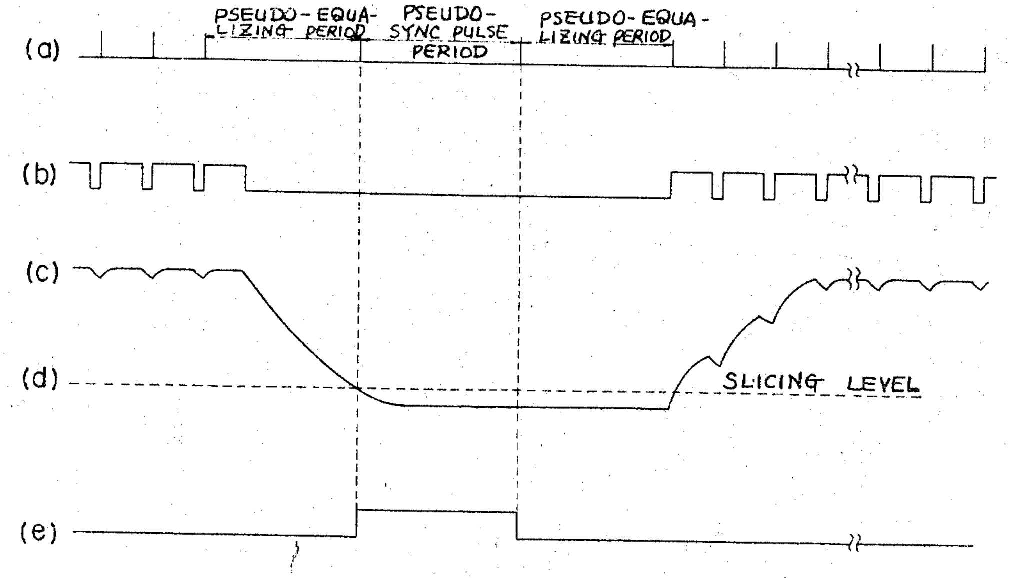
FIG. 10 shows a series of wave forms, illustrating the reproduction of the composite video signal shown in FIG. 9 and the separation of vertical sync pulses from the reproduced composite video signal.

Part of the signal branched off at junction 19 and schematically represented in FIG. 10(*a*) is fed to monostable multivibrator 23, the time constant of which is selected to be slightly smaller than the horizontal scanning period. The input signal acts to trigger this multivibrator 23 which will produce a series of rectangular pulses as shown in FIG. 10(*b*), the latter pulses being fed to integrator circuit 24. The integrated output signal as shown in FIG. 10(*c*) is fed through an amplifier 26 to monostable multivibrator 28 so as to trigger it. The output signal from the amplifier 26 is shown at (H) [see also FIG. 7(*e*) and FIG. 10(*d*)]. The time constant of the multivibrator 28 is so selected that it is shorter than the vertical scanning period.

The output signal (I) from multivibrator 28 corresponds to the signal wave shown in FIG. 7(*f*) which contains thus otherwise possible superfluous pulses caused by occasional dropouts. The output from multivibrator 28 is fed through junction 25 to differentiator circuits 36 and 29. The output (J) from the circuit 29 [see also FIG. 7(g)] is fed to vertical sync signal shaping circuit 30, so as to regenerate sync pulses. The differentiated output signal from circuit 36 is conveyed to vertical blanking signal shaping circuit 27 for the regeneration of the blanking signal.

The compound video signal at junction 16 is conveyed to equalizer circuit 17, the output signal (L) therefrom contains considerable wave distortion during each of the vertical blanking period and is conveyed further to delay circuit 31. This signal (M) processed in this circuit to represent a specific delay which comprises a delay the horizontal sync signal as well as vertical sync signal relative to video signal, being given, as in the aforementioned way, during the regeneration periods for shaping the horizontal and vertical sync signals, plus a further delay given to the sync signal during processing in the delay circuit, as was already referred to hereinbefore. The delayed signal delivered from delay circuit 31 is conveyed to D.C.-restoration circuit 32. The D.C.-restored signal M delivered from the latter, as at (M), is conveyed to blanking mixer 33 wherein it is mixed with horizontal blanking signal (N) delivered from the circuit 22, as well as vertical blanking signal (O) delivered from circuit 27, respectively. In this case, the signal is deficient of sync pulses having the same polarity as that of the video signal, thereby forming the horizontal and vertical blanking periods of the compound video signal. This compound video signal (P) is conveyed to sync signal mixer 34 and mixed therein with horizontal sync signal (Q) from circuit 21, as well as vertical sync signal (K) from circuit 30, thereby producing a regular compound video signal (R) formed with sync pulses with opposite polarity to that of the video signal component. This synthesized composite signal is conveyed through output terminal 35 to a conventional picture monitor, (not shown).

Figure 11:
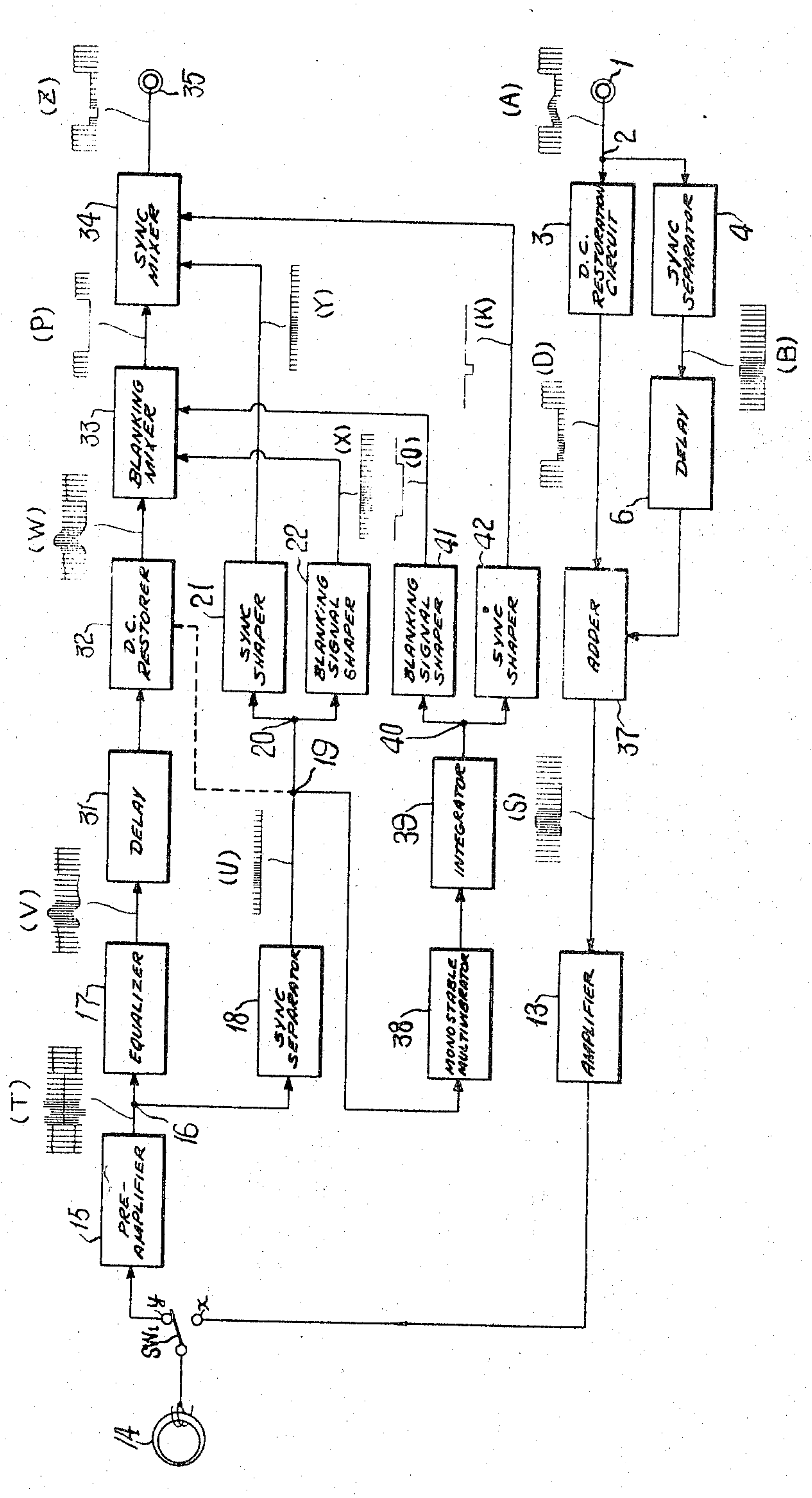
FIG. 11 is a block diagram of a second embodiment of the magnetic recording and reproducing system similar to that shown in FIG. 8.

In a modified arrangement shown in FIG. 11, numeral 1 denotes the input terminal as before, adapted for receiving the regular television signal (A), which is then conveyed through junction 2 to D.C.-restoration circuit 3 and sync separator 4. From the latter, the signal, having been deprived of the video component, and represented by a series of sync pulses (B) having its polarity reversed is thence conveyed to delay circuit 6, so as to shift each of the horizontal sync pulses for positioning the leading edge of each pulse substantially at the midpoint of each of the horizontal blanking period as was referred to with reference to FIG. 4 hereinbefore. The D.C.-restored signal (D) in the circuit 3 is conveyed thence to adder 37 so as to be combined with the delayed sync signal delivered from circuit 6, thereby providing a compound video signal (S) having its sync pulses intentionally shifted towards related back porches, respectively.

This composite signal is amplified in amplifier 13 and conveyed through stationary contact *x* of switch SW1 to recording and reproducing head 14 where it may be conventionally recorded on a magnetic tape, (not shown).

When it is desired to reproduce the recorded information, it is picked up from the record tape by the head and the pick-up current is conveyed through another contact *y* to preamplifier 15. The amplified signal at (T) is conveyed to equalizer 17, and then to separator 18. The differentiated pulse series at (U) from the circuit 18 is conveyed further through junctions 19 and 20 to horizontal sync signal shaping circuit 21 and horizontal blanking signal shaping circuit 22.

Another portion of the signal part at junction 19 is conveyed to a monostable multivibrator 38; the time constant thereof being selected to be slightly shorter than one-half of the regular horizontal scanning period, and, hence, it produces a series of rectangular pulses as shown in FIG. 5(*b*). This pulse series is integrated in an integrator 39. The integrated signal is passed through junction 40 to vertical blanking signal shaping circuit 41 and horizontal sync signal shaping circuit 42. In these circuits the integrated signal is subjected to width and amplitude discrimination resulting in the vertical blanking signal (O) and the vertical sync signal (K), respectively.

The composite video signal is, on the other hand, fed through junction 16 to equalizer circuit 17, which produces wave distortion during each of the vertical blanking periods, upon being equalized therein, in its output signal (V). This output signal is then delayed in delay circuit 31 and processed in D.C.-restoration circuit 32 as before, resulting in signal (W) which is conveyed to a blanking mixer 33, where it is combined with the horizontal blanking signal (X) and with vertical blanking signal (O). The blanking mixer 33 eliminates the sync pulses of the same polarity as the video signal component from the composite video signal and, thus, produces an output (P). This composite video signal is then fed to sync signal mixer 34, therein being mixed with the horizontal sync signal (Y) and the vertical sync signal (K). In this way, a regular reproduced and regenerated composite video signal (Z) can be reliably and accurately obtained. This signal is then delivered through output terminal 35 to a picture monitor.

Figure 12:
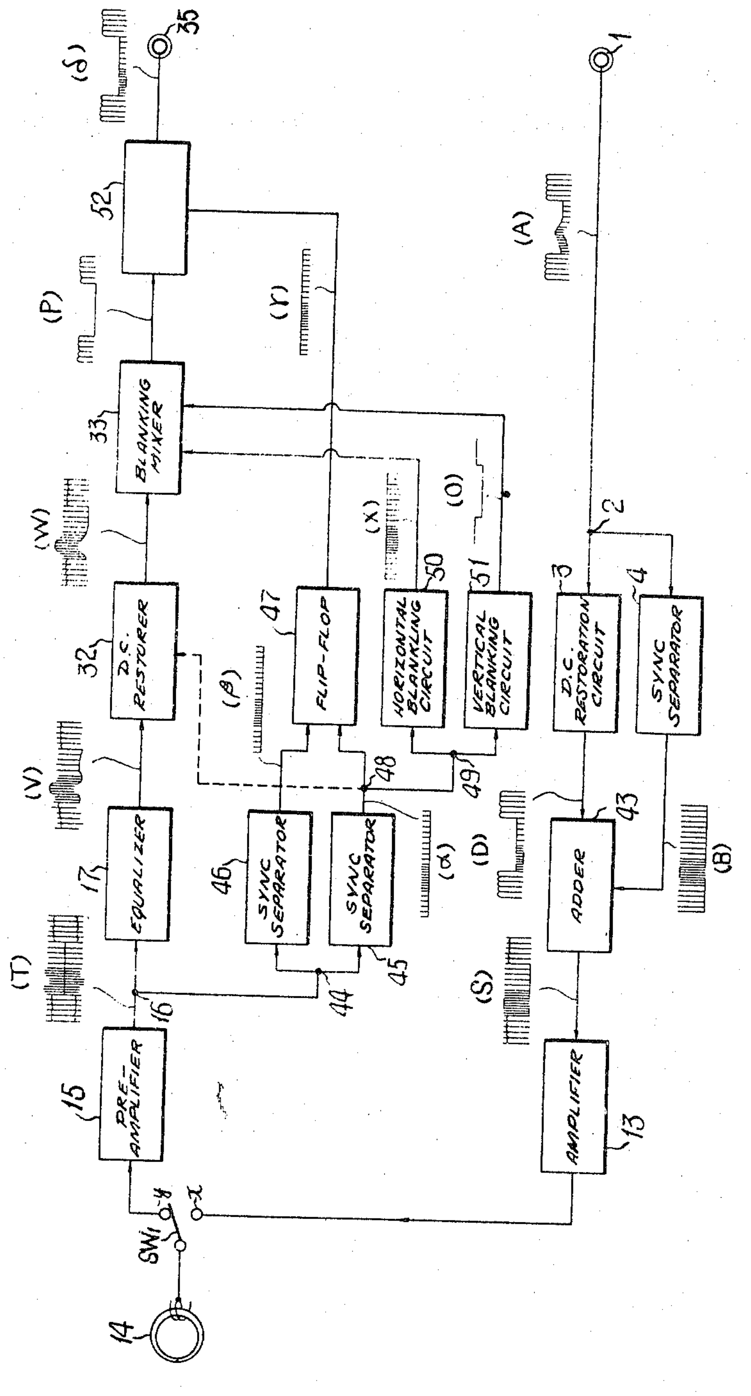
FIG. 12 is a block diagram of a third embodiment similar to that shown in FIG. 8.

In a still further modified arrangement adapted for carrying out the video tape recording and reproducing, as shown in FIG. 12, the pick-up signal is amplified in amplifier 15 and fed through junctions 16 and 44 to first and second sync separators 45 and 46. From the formed separator, a series of acute pulses ($\alpha$) corresponding to the rising edges of the compound sync pulses is separated, while from the latter separator, a series of acute pulses ($\beta$) corresponding to the descending edges of the sync pulses is delivered. These pulse series are fed to different triggering terminals of flip-flop 47, so as to form a compound sync signal ($\gamma$). The pulse series delivered from first sync separator 45 is conveyed through junctions 48 and 50 to horizontal and vertical blanking signal shaping circuits 50 and 51, respectively.

The equalized signal from equalizer circuit 17 contains considerable wave distortion during and in proximity of each of the horizontal blanking periods as shown at (V) and it is fed to D.C.-restoration circuit 32, the restored output signal (W) being fed to blanking mixer 33, so as to be mixed with both kinds of blanking signals (X) and (O), as before. The combined signal is further processed in the same manner as set forth hereinbefore so as to reproduce and regenerate a conventional television signal ($\delta$) as before.

Of course it should be understood that there may be various different embodiments of the system without departing from the scope of the present invention.

Having now particularly described and ascertained the nature of our said invention, and in what manner the same is to be performed, we claim:

1. The improvement in a direct recording magnetic video tape recorder and reproducer having an input terminal for receiving a first composite video signal having video signal and horizontal sync signal components, comprising:

(a) means for separating said horizontal sync signal components from said video signal components;

(b) means for inverting said separated horizontal sync signal components;

(c) means for delaying said inverted horizontal sync signal components;

(d) means for combining said delayed horizontal sync signal components with said separated video signal components to result in a second composite video signal; and (e) means for recording said second composite video signal, whereby, upon reproduction of said second composite video signal the separation of said horizontal sync signal components from said second composite video signal is facilitated.

2. The improvement of claim 1 wherein said delay is such to position either the leading or falling edge of said horizontal sync signal at the center of its related blanking period.

3. The improvement of claim 1 further comprising: means to eliminate said horizontal sync signal components from said second composite video signal for time intervals.

References Cited

UNITED STATES PATENTS 2,204,427 6/1940 Moller ------------ 178—7.7

FOREIGN PATENTS 1,041,633 6/1964 Great Britain.

ROBERT L. GRIFFIN, Primary Examiner

D. E. STOUT, Assistant Examiner

U.S. Cl. X.R.

178—69.5